UNITED STATES PATENT OFFICE.

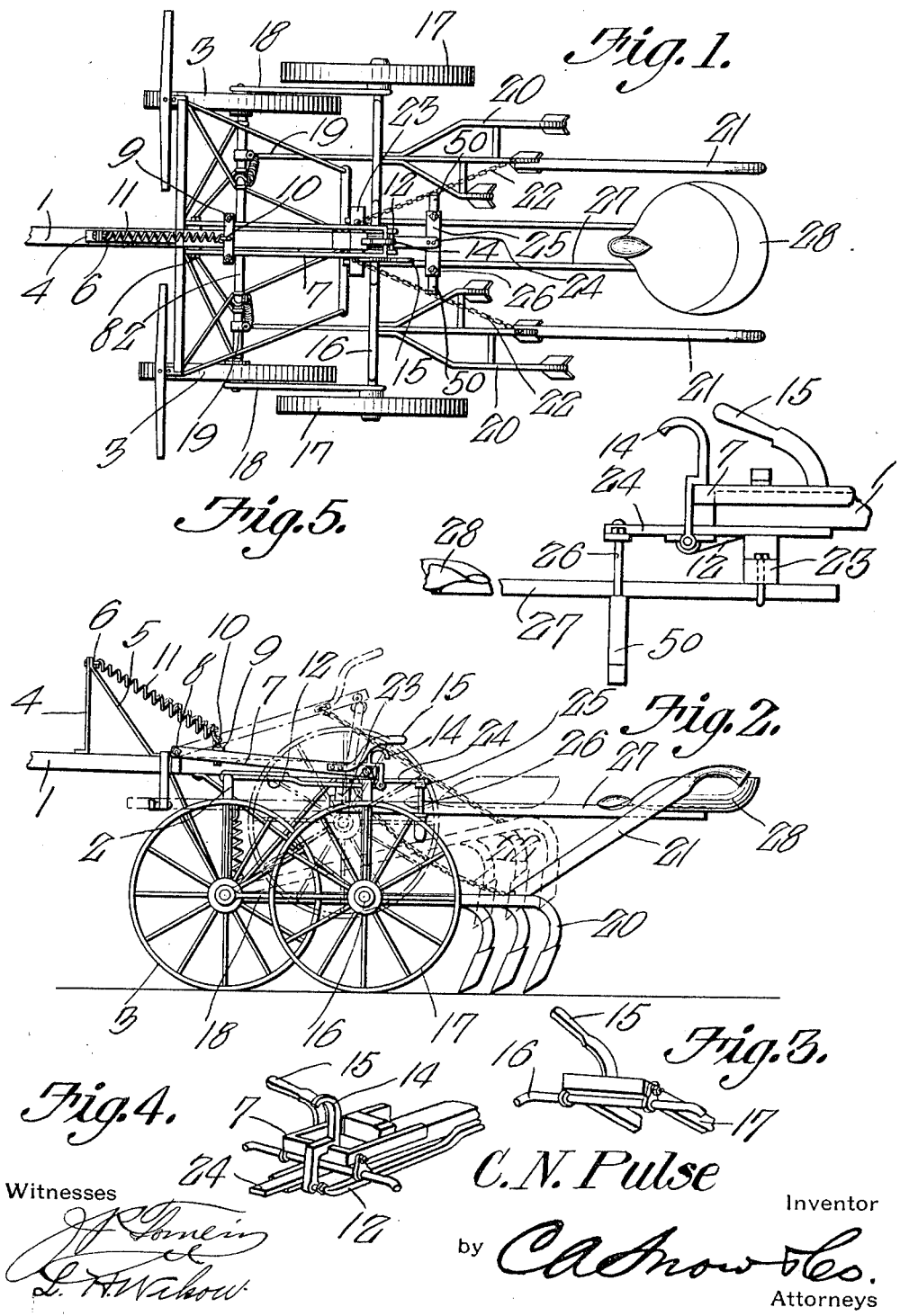

CHARLES N. PULSE, OF HILLSBORO, OHIO.

RIDING ATTACHMENT FOR CULTIVATORS.

1,066,843.  Specification of Letters Patent.  Patented July 8, 1913.

Application filed September 18, 1911. Serial No. 649,799.

*To all whom it may concern:*

Be it known that I, CHARLES N. PULSE, a citizen of the United States, residing at Hillsboro, in the county of Highland and State of Ohio, have invented a new and useful Riding Attachment for Cultivators, of which the following is a specification.

This invention relates to riding attachments for cultivators, and one of the objects of the invention is to provide means whereby the driver's seat may be supported at such a distance back of the beam of the cultivator, as to enable the occupant of the seat to grasp readily, the handles of the cultivator.

A further object of the invention is to provide means whereby the weight of the driver will be supported, and the necks of the draft animals will be relieved.

A further object of the invention is to provide means whereby, at the end of a row, the supplemental wheels which support the driver's seat may be elevated, together with the plows of the cultivator.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 is a top plan of a cultivator equipped with the device of the present invention; and Fig. 2 is a side elevation. Fig. 3 is a perspective showing the connection between the yoke and the supplemental axle; Fig. 4 is a perspective showing the latch mechanism whereby the yoke is maintained depressed; and Fig. 5 is a side elevation of the guide devices whereby the seat bars are supported.

The tongue of the cultivator is denoted generally by the numeral 1, and attached to the tongue 1 is the main axle 2, which is of arched form, as usual. The main axle 2 carries the main supporting wheels 3.

Fixed to and rising from the tongue 1, is a standard 4, maintained in place by a rearwardly extended brace 5. The upper ends of the standard 4 and the brace 5 carry an eye 6 or the like. A yoke 7 is pivotally connected as shown at 8, with the tongue 1, the bend of the yoke 7 extending around the rear end of the tongue. Secured to the yoke 7, transversely, is a cross bar 9, carrying a hook 10 or other securing element. The elements 6 and 10 are connected by a retractile spring 11, preferably of helical construction.

A spring member 12 extends rearwardly, from the axle 2, along the sides of the tongue 1, and across the rear end of the tongue. Secured to the spring member 12, is a hooked latch 14, adapted, as clearly shown in Fig. 4, to engage over the rear end of the yoke 7, to hold the yoke 7 depressed, against the action of the spring 11. Noting Fig. 5 it will be observed that the latch 14 is curved at its upper end, for engagement with the end of the yoke 7, whereby the end of the yoke will engage automatically with the latch. Attached to the yoke 7, is a rearwardly extended handle 15, whereby the yoke may be depressed. The spring member 12 serves to support the hooked latch 14 yieldable, so that the rear end of the yoke 7 may engage with the latch. The yoke 7 carries an arched, supplemental axle 16, supporting supplemental wheels 17. The supplemental axle 16 is connected with the main axle 2, pivotally by means of links 18.

Pivotally connected with the main axle 2, as shown at 19, and rearwardly extended therefrom, in spaced relation, are gang plows 20, provided adjacent their rear ends, with upwardly and rearwardly extended handles 21. Chains 22, or like flexible elements, connect the yoke 7 with the gang plows 20.

Fixed to and depending from the tongue 1, adjacent its rear end, is a transverse block 23. The tongue 1 is equipped at its rear end with an extension 24, carrying a cross bar 25, from which extends a yoke 26. The seat bars 27 slide through the yoke 26, the seat bars being supported, thus, by the yoke. The yoke 26 may support the common and well known hangers 50 whereby the gang plows 20 may be upheld while going to and from the field. The forward ends of the seat bars 27 engage beneath the block 23, so that when the seat 28 which is at the rear ends of the bars 27, is occupied, the forward ends of the bars 27 will be prevented from tilting upwardly, the elements 23 and 26 constituting a guide device for the seat bars.

The operation of the device is as follows: When it is desired to use the device as a riding cultivator, the seat bars 27 are retracted, so as to position the seat 28 between the handles 21 of the gang plows 20. The latch 14 is engaged over the rear end of the yoke 7, and the yoke 7 is held down upon the beam 1, the spring 11 being put under tension. The supplemental axle 16 is thus held depressed, and the supplemental wheels 17 are maintained in contact with the ground. The occupant of the seat 28 may grip the handles 21 and readily direct the action of the gang plows 20. When the end of the row is reached, the latch 17 is disengaged from the yoke 7, whereupon the spring 11 will draw the free, rear end of the yoke 7 upwardly, elevating the supplemental axle 16 and the wheels 17 out of engagement with the ground, the chains 22 elevating the gang plows 20. Under such circumstances, the cultivator may readily be turned about, upon two, main wheels 3.

When it is desired to use the device as a walking cultivator, the parts are positioned as shown in Fig. 2, with the exception that the bars 27 are slid forwardly, in order to dispose the seat 28 in an out-of-the-way position.

It will be understood readily, that, when the handles 21 are elevated, they may be seized, and pulled downwardly, the chains 22 depressing the yoke 7, and putting the spring 11 under tension, the latch 14 automatically engaging with the rear end of the yoke 7, to hold the same depressed.

What is claimed is:—

1. The combination with a wheel supported structure, of supplemental wheels, a connection between the supplemental wheels and said structure, means for shifting the connection to elevate the supplemental wheels out of contact with the ground, cultivating elements movably connected to the structure independently of the connection, a handle extending from the cultivating elements and means for transmitting motion from said handle to the connection during the movement of the cultivating devices into engagement with the soil to shift the supplemental wheels into contact with the soil.

2. A cultivator including a wheel supported structure, soil-engaging devices movably connected thereto, a handle secured to said devices, supplemental wheels, connections between the wheels and structure and independent of the soil-engaging devices, means for transmitting motion from the handle, during its downward movement, to the connections to lower the supplemental wheels, and means for raising the supplemental wheels and the soil-engaging devices.

3. A cultivator including a wheel supported structure, soil-engaging devices movably connected thereto, a handle secured to said devices, supplemental wheels, connections between the wheels and structure and independent of the soil engaging devices, means for transmitting motion from the handle, during its downward movement, to the connections to lower the supplemental wheels, and means for simultaneously raising the supplemental wheels and soil-engaging devices out of contact with the ground.

4. A cultivator including a wheel supported structure, soil engaging devices movably connected thereto, a handle secured to said devices, supplemental wheels, connections between the supplemental wheels and structure and independent of the soil-engaging devices, means for transmitting motion from the handle, during its downward movement, to the connections to simultaneously lower said soil-engaging devices and supplemental wheels, and means for simultaneously raising the supplemental wheels and soil engaging devices.

5. A cultivator including a wheel-supported structure, soil-engaging devices movably connected thereto, a handle attached directly to said devices, supplemental wheels independent of the soil-engaging devices, connections between the wheels and structure and movable independently of the soil-engaging devices, means for transmitting motion from the handle, during its downward movement, to the connections to lower the supplemental wheels and soil-engaging devices into engagement with the ground, and means, placed under stress, during the lowering of the supplemental wheels for automatically initiating and completing the elevation of said wheels and the soil engaging devices when the handle is released.

6. The combination with a wheel supported axle and a tongue fixedly mounted thereon, of a member pivotally connected to the tongue, means for shifting said member relative to the tongue, a supplemental axle pivotally engaged by said member, and movable therewith, pivotal connections between the axles, wheels connected to the supplemental axle, a soil-engaging device pivotally connected to the first named axle, a handle upon the soil-engaging device, and a connection between said device and the pivoted member.

7. The combination with an arched axle, wheels supporting the same, and a tongue fixed upon the axle, of a supplemental axle, pivotal connections between the lower ends of the two axles, supplemental wheels carried by said supplemental axle, a member pivotally mounted on the tongue and pivotally connected to the supplemental axle, yielding means for holding said member normally elevated to support the supplemental axle and wheels, cultivating devices pivotally connected to the first named axle, a connection between said cultivating devices and the pivoted member, and means extending from said pivoted member for shifting it relative to the tongue.

8. A cultivator comprising a beam; a main axle rigidly carried by the beam; wheels upon the main axle; a yoke pivotally connected with the beam; a supplemental axle pivotally connected with the yoke; wheels carried by the supplemental axle; a soil-engaging element pivotally connected with the first named axle and movable independently of the last named wheels; a flexible element connecting the soil-engaging element with the yoke; spring means for initially elevating the yoke; and latch mechanism engaging the yoke, to maintain the second named wheels and the soil-engaging element in engagement with the ground, and to maintain said spring means under tension.

In testimony that I claim the foregoing as my own, I have hereto affixed my signature in the presence of two witnesses.

CHARLES N. PULSE.

Witnesses:
JOHN A. KESLER,
NATHANIEL ROUSH, Jr.

---

Copies of this patent may be obtained for five cents each, by addressing the " Commissioner of Patents, Washington, D. C."